April 27, 1948.  J. F. WALLACE  2,440,353
SHOCK ABSORBER
Filed Feb. 2, 1945  2 Sheets-Sheet 1

INVENTOR.
JOHN F. WALLACE
BY
Kwis, Hudson, Boughton & Williams
ATTORNEYS

April 27, 1948.   J. F. WALLACE   2,440,353
SHOCK ABSORBER
Filed Feb. 2, 1945   2 Sheets-Sheet 2

INVENTOR.
JOHN F. WALLACE
BY
Kwis, Hudson, Boughton & Williams
ATTORNEYS

Patented Apr. 27, 1948

2,440,353

UNITED STATES PATENT OFFICE 2,440,353

SHOCK ABSORBER

John F. Wallace, University Heights, Ohio, assignor to The Cleveland Pneumatic Tool Company, Cleveland, Ohio, a corporation of Ohio Application February 2, 1945, Serial No. 575,858

2 Claims. (Cl. 267—64)

This invention relates to improvements in shock absorbers, more particularly hydropneumatic shock absorbers for airplanes. Shock absorbers for this purpose are often of the type in which a metering pin borne by one of two telescoping elements is aligned with an orifice carried by the other element, and runs through that orifice in the operation of the strut. The orifice plate is usually mounted in the inner end of a tube which is attached at its outer end to the second telescoping element and which surrounds the metering pin when the shock absorber is compressed. It is important to center this tube accurately, especially the free end thereof in which the orifice plate is situated. Heretofore this has been an expensive part of the assembly, partly because the position of the attaching means is such as to be hard to see and to reach.

One of the objects of the present invention is the provision of a method and means for mounting the aforesaid tube which shall lend itself to rapid assembly and require little skill.

Another object is the provision of means which shall utilize the pressure fluid in the strut for perfecting the centering of the orifice plate and that of the metering pin automatically.

Other objects and features of novelty will appear as I proceed with the description of those embodiments of the invention which, for the purposes of the present application, I have illustrated in the accompanying drawings, in which Fig. 1 is an elevational view, partly in vertical section, of a hydropneumatic shock absorber for airplanes embodying the invention.

Figure 1:
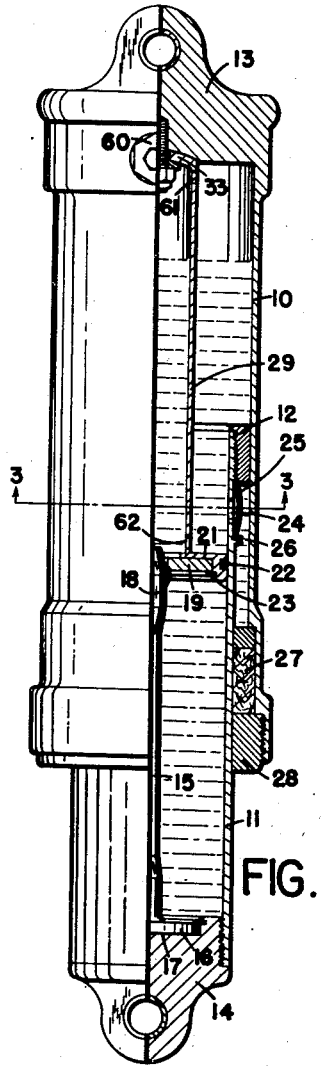
Figure 4:
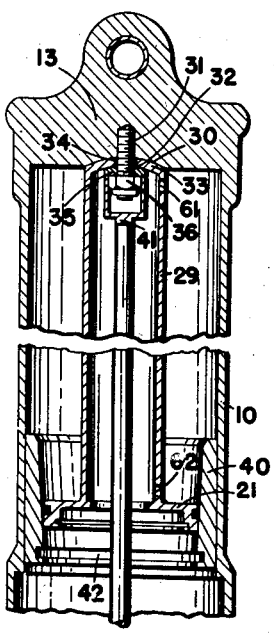
Fig. 4 is a fragmental view similar to a portion of Fig. 1 but showing the shock absorber in the process of being assembled.
Figure 5:
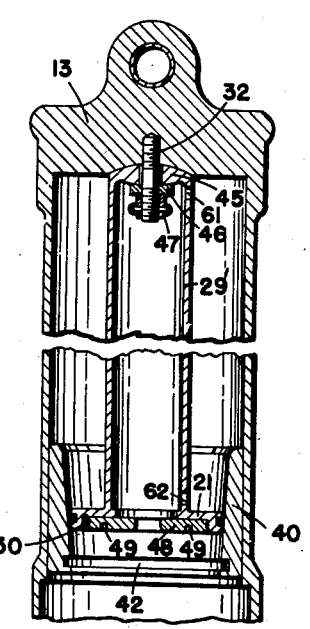
Fig. 5 is a fragmental view similar to Fig. 4 illustrating a modified form of the invention.
Figure 2:
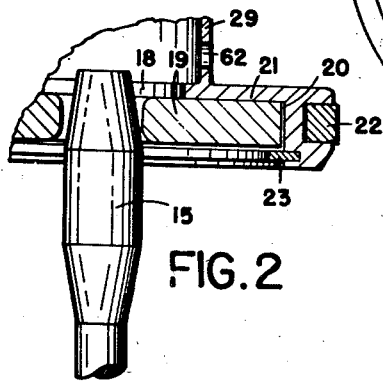
Fig. 2 is an enlarged fragmental detail sectional view of the orifice plate and associated parts.
Figure 3:
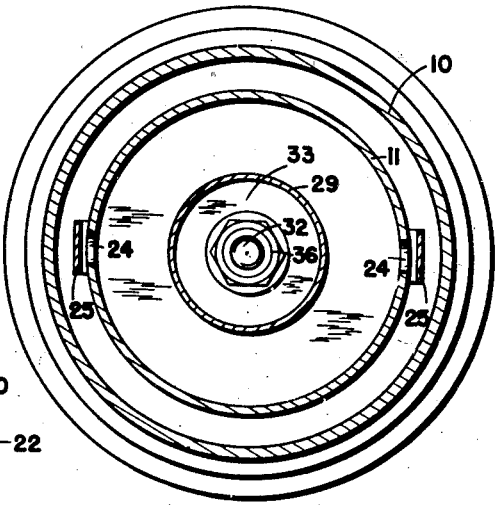
Fig. 3 is a horizontal sectional view on a larger scale, taken substantially on the line 3—3 of Fig. 1.
Figure 6:
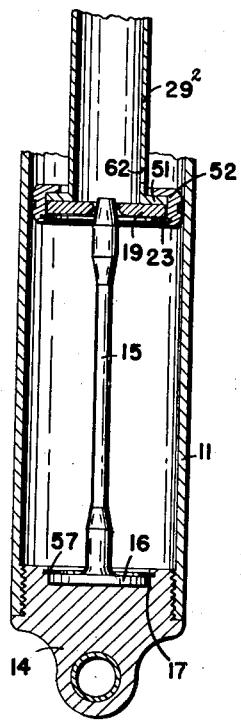
Fig. 6 is a fragmental vertical sectional view of a modified form of the invention.
Figure 8:
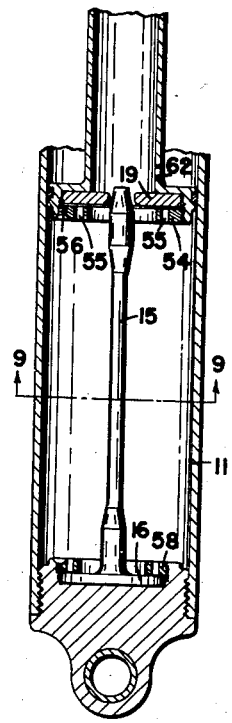
Fig. 8 is a view similar to Fig. 6 showing a modified form of mounting for the metering pin and for the orifice plate.
Figure 9:
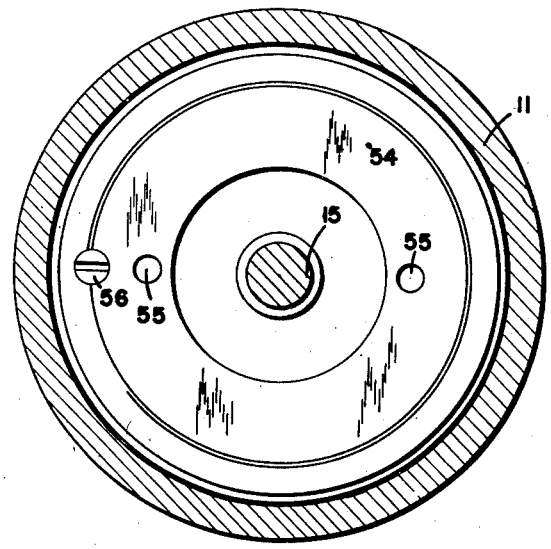
Fig. 9 is a horizontal sectional view on a larger scale taken substantially on the line 9—9 of Fig. 8.
Figure 7:
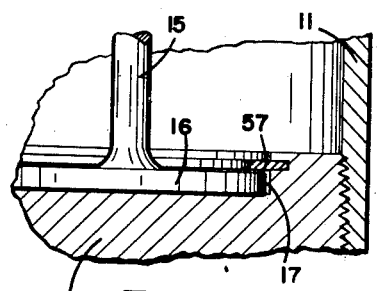
Fig. 7 is a fragmental vertical sectional view on a larger scale illustrating the mounting of the metering pin which provides automatic centering of the latter.

Referring first to Figs. 1, 2 and 3 of the drawings, I have there illustrated a hydropneumatic shock absorber comprising two telescoping cylindrical elements 10 and 11. On the inner end of element 11 there is mounted a sleeve or ring 12 which has a nice sliding fit upon the inner wall of element 10. The element 10 is shown closed at its outer end by an integral end wall 13, while the element 11 is closed preferably by a separate end wall 14 threaded into that element, these features of the construction being unimportant so far as the present invention is concerned.

Element 11 carries a metering pin 15 of more or less conventional form having a base 16 which fits somewhat loosely into a socket 17 for a purpose which will later appear. The metering pin 15 extends through an orifice 18 in an orifice plate 19 mounted in a socket 20 formed in a carrier 21 which, in the illustrated case, is a piston slidable in the element 11. A piston ring 22 serves to seal the sliding joint between this piston and its cylinder. In order to prevent accidental dislocation of the orifice plate 19, I may mount a split ring 23 in the carrier 21, that is by fitting it into a groove in the carrier which is so located that the plate 19 has some freedom of movement lengthwise of the strut, this clearance being exaggerated in Fig. 2 of the drawing in order to better illustrate the invention. The socket 20 is also of slightly greater diameter than the diameter of plate 19.

Cylindrical element 11, slightly below the ring or sleeve 12, may have a pair of oppositely disposed ports 24 therethrough which at times provide communication from one side to the other of the element 11, but which may be covered by spring leaf valves 25 disposed between ring 12 and a rib 26 on element 11. At the lower end of cylindrical element 10 there is an internal packing 27 which may be of any conventional character and may be held in place by a gland nut 28 threaded into the element and constituting a bearing between the two telescoping elements.

The piston or carrier 21 is supported by a tube 29 which extends upwardly to the end wall 13 of element 10. In that wall there is formed a spherical cavity 30 which is centered with respect to the element axis as nearly as may be. In the end wall 13 I also drill an axial hole 31 and thread the same for the reception of a stud 32. The upper extremity of tube 29 is closed by an end wall 33 also of spherical contour, these two curved surfaces being formed upon the same radius. Wall 33 has a central bore 34 somewhat larger than the diameter of stud 32. A washer 35 having a spherical surface complementary to the inner surface of wall 33 surrounds stud 32, and a nut 36 is threaded onto the stud beneath the washer 35.

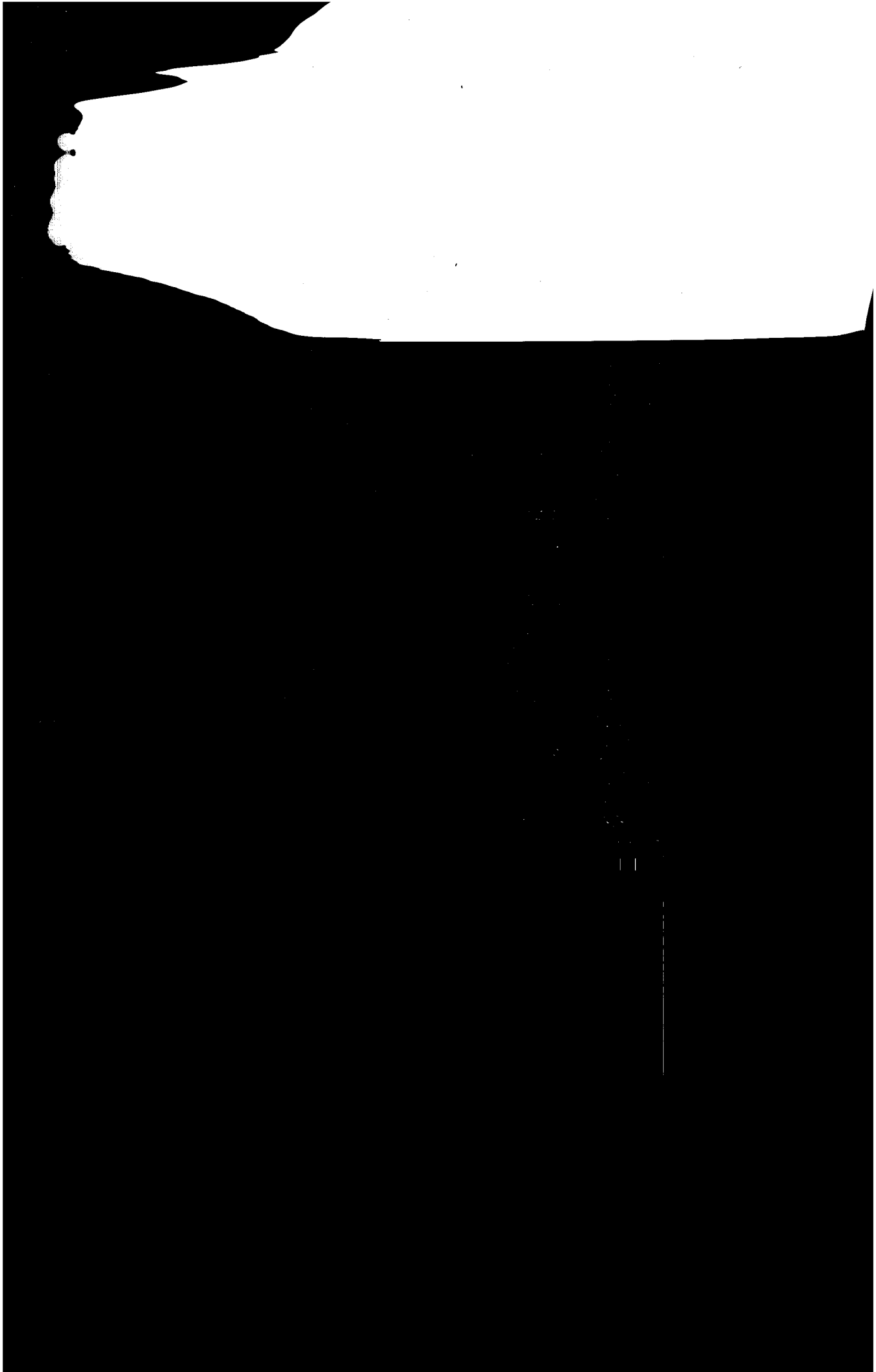

In assembling this part of the device prior to bringing together the two telescoping elements 10 and 11, the tube 29 and the carrier 21 are pushed into place in the cylinder 10, the opening 34 in the end wall of the tube being caused to surround the stud 32 so that the convex upper end of the tube seats against the concave surface 30 of the element in the manner of a ball and